United States Patent
Mishima

(10) Patent No.: US 7,963,355 B2
(45) Date of Patent: Jun. 21, 2011

(54) VEHICLE FRONT END STRUCTURE

(75) Inventor: Naoki Mishima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 607 days.

(21) Appl. No.: 12/046,633

(22) Filed: Mar. 12, 2008

(65) Prior Publication Data

US 2008/0231084 A1    Sep. 25, 2008

(30) Foreign Application Priority Data

Mar. 23, 2007    (JP) .................................. 2007-077276

(51) Int. Cl.
*B60K 11/04* (2006.01)
(52) U.S. Cl. ...................................... 180/68.4; 280/784
(58) Field of Classification Search ................ 180/68.4, 180/274, 232; 280/784; 296/35.2, 187.03, 296/187.04, 193.09, 203.02
See application file for complete search history.

(56) References Cited

U.S. PATENT DOCUMENTS

| | | | | |
|---|---|---|---|---|
| 4,541,645 A * | 9/1985 | Foeldesi | ..................... | 180/68.4 |
| 4,651,839 A * | 3/1987 | Isobe | ..................... | 180/68.4 |
| 4,766,968 A * | 8/1988 | Matsunaga | ..................... | 180/68.4 |
| 5,291,961 A * | 3/1994 | Attinger et al. | ..................... | 180/68.4 |
| 5,544,714 A * | 8/1996 | May et al. | ..................... | 180/68.4 |
| 5,558,310 A * | 9/1996 | Furuie et al. | ..................... | 248/573 |
| 6,206,129 B1 * | 3/2001 | Breed et al. | ..................... | 180/274 |
| 6,260,609 B1 * | 7/2001 | Takahashi | ..................... | 165/69 |
| 6,364,403 B1 * | 4/2002 | Ozawa et al. | ..................... | 296/187.09 |
| 6,412,581 B2 * | 7/2002 | Enomoto et al. | ..................... | 180/68.4 |
| 6,513,579 B1 * | 2/2003 | Kent et al. | ..................... | 165/67 |
| 6,668,956 B1 * | 12/2003 | Pelage et al. | ..................... | 180/68.4 |
| 6,675,921 B2 * | 1/2004 | Brown | ..................... | 180/68.4 |
| 6,685,258 B2 * | 2/2004 | Brogly et al. | ..................... | 296/203.02 |
| 7,036,617 B2 * | 5/2006 | Harada | ..................... | 180/68.4 |
| 7,044,246 B2 * | 5/2006 | Fujieda | ..................... | 180/68.4 |
| 7,108,092 B2 * | 9/2006 | Suwa et al. | ..................... | 180/68.4 |
| 7,497,289 B2 * | 3/2009 | Kwun et al. | ..................... | 180/68.4 |
| 7,753,419 B2 * | 7/2010 | Kondo | ..................... | 293/117 |
| 7,766,112 B2 * | 8/2010 | Kapadia et al. | ..................... | 180/68.4 |
| 2001/0001994 A1 * | 5/2001 | Enomoto et al. | ..................... | 180/68.4 |
| 2002/0043820 A1 * | 4/2002 | Brogly et al. | ..................... | 296/203.02 |
| 2002/0157885 A1 * | 10/2002 | Brown | ..................... | 180/68.4 |
| 2004/0195020 A1 * | 10/2004 | Suwa et al. | ..................... | 180/68.4 |
| 2005/0062315 A1 | 3/2005 | Andritter et al. | | |
| 2006/0081354 A1 * | 4/2006 | Miura et al. | ..................... | 165/41 |
| 2008/0017429 A1 * | 1/2008 | Palande et al. | ..................... | 180/68.4 |
| 2008/0308333 A1 * | 12/2008 | Kapadia et al. | ..................... | 180/68.4 |
| 2010/0078149 A1 * | 4/2010 | Yoshimitsu et al. | ..................... | 165/67 |

FOREIGN PATENT DOCUMENTS

| | | |
|---|---|---|
| DE | 103 37 553 A1 | 6/2005 |
| DE | 10 2004 032 545 A1 | 2/2006 |
| EP | 1 577 196 A1 | 9/2005 |
| JP | 2003-063445 | 3/2003 |
| WO | WO-03/070503 A1 | 8/2003 |

* cited by examiner

*Primary Examiner* — J. Allen Shriver, II
*Assistant Examiner* — Jacob Meyer
(74) *Attorney, Agent, or Firm* — Global IP Counselors, LLP

(57) ABSTRACT

A vehicle front end structure is provided with a vehicle body frame forming a frontward portion of a vehicle, a longitudinal acceleration sensor, a frontward vehicle component, a rearward extending part and a bracket. The frontward vehicle component is disposed to protrude farther forward than the vehicle body frame. The rearward extending part is connected to the frontward vehicle component and extends to a rearward position of the vehicle body frame. The bracket fixes the rearward extending part to the vehicle body frame at a connection area such that the rearward extending part is located farther rearward than the connection area of the vehicle body frame, with the bracket being constructed such that the rearward extending part releases from the vehicle body frame when a force acts to move the frontward vehicle component and the rearward extending part rearward.

12 Claims, 6 Drawing Sheets

VEHICLE FRONT END STRUCTURE

CROSS-REFERENCE TO RELATED APPLICATIONS

This application claims priority to Japanese Patent Application No. 2007-077276, filed on Mar. 23, 2007. The entire disclosure of Japanese Patent Application No. 2007-077276 is hereby incorporated herein by reference.

BACKGROUND OF THE INVENTION

1. Field of the Invention

The present invention generally relates to a front end structure for a vehicle body and a bracket for supporting a rearward extending part arranged on a frontward portion of the vehicle body.

2. Background Information

In order to improve the safety performance of a vehicle during a collision, it is important to deploy an air bag for protecting a passenger when a frontal collision is detected. A well known method of detecting a frontal collision is to provide an acceleration sensor on a vehicle body frame of a frontward portion of the vehicle. For example, Japanese Laid-Open Patent Publication No. 2003-63445 discloses a vehicle body frame that has an acceleration sensor mounted on a vehicle body frame of a frontward portion of the vehicle.

In view of the above, it will be apparent to those skilled in the art from this disclosure that there exists a need for an improved front end structure and an improved vehicle body frontal pipe securing bracket. This invention addresses this need in the art as well as other needs, which will become apparent to those skilled in the art from this disclosure.

SUMMARY OF THE INVENTION

Vehicles have been developed with an acceleration sensor provided on a vehicle body frame at a frontward portion of the vehicle. In such vehicles, there are cases in which an auxiliary machine driven by the engine is fastened or otherwise secured to the frame at the frontward portion of the vehicle. In particular, the auxiliary machine driven is often mounted on the same frame on which the acceleration sensor is provided. Particularly when the auxiliary machine is positioned farther frontward than the vehicle body frame, there is the possibility that the auxiliary machine will be pushed rearward if the vehicle undergoes a frontal collision.

When the auxiliary machine fastened to the front of the vehicle body frame is pushed rearward due to a collision of the vehicle, there is the possibility that the vehicle body frame will undergo deformation. Consequently, there is the possibility that the detection direction of the acceleration sensor will become misaligned with respect to the longitudinal direction due to the deformation of the vehicle body frame on which it is mounted. This misalignment of the acceleration sensor may result in an inaccurate detection of the longitudinal acceleration resulting from the collision. Such a misalignment can cause the timing at which an air bag is deployed to be later than a desired timing.

The present invention was conceived in view of this issue. One object is to provide a vehicle front end structure and a vehicle body frontal pipe securing bracket that can prevent the detection direction of an acceleration sensor mounted on a vehicle body frame of a vehicle from changing during a collision and, thereby, prevent the deployment of an air bag of the vehicle from being delayed.

In view of the above, a vehicle front end structure is proposed that basically comprises a vehicle body frame, an acceleration sensor, a frontward vehicle component, a rearward extending part and a bracket. The vehicle body frame forms a frontward portion of a vehicle. The acceleration sensor is mounted to the vehicle body frame to detect a longitudinal acceleration rate of the vehicle. The frontward vehicle component is disposed to protrude farther forward than the vehicle body frame with respect to the vehicle. The rearward extending part is connected to the frontward vehicle component and extends from the frontward vehicle component to a rearward position of the vehicle body frame with respect to the vehicle. The bracket fixes the rearward extending part to the vehicle body frame at a connection area such that the rearward extending part is located farther rearward than the connection area of the vehicle body frame, with the bracket being constructed such that the rearward extending part releases from the vehicle body frame when a force acts to move the frontward vehicle component and the rearward extending part rearward.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
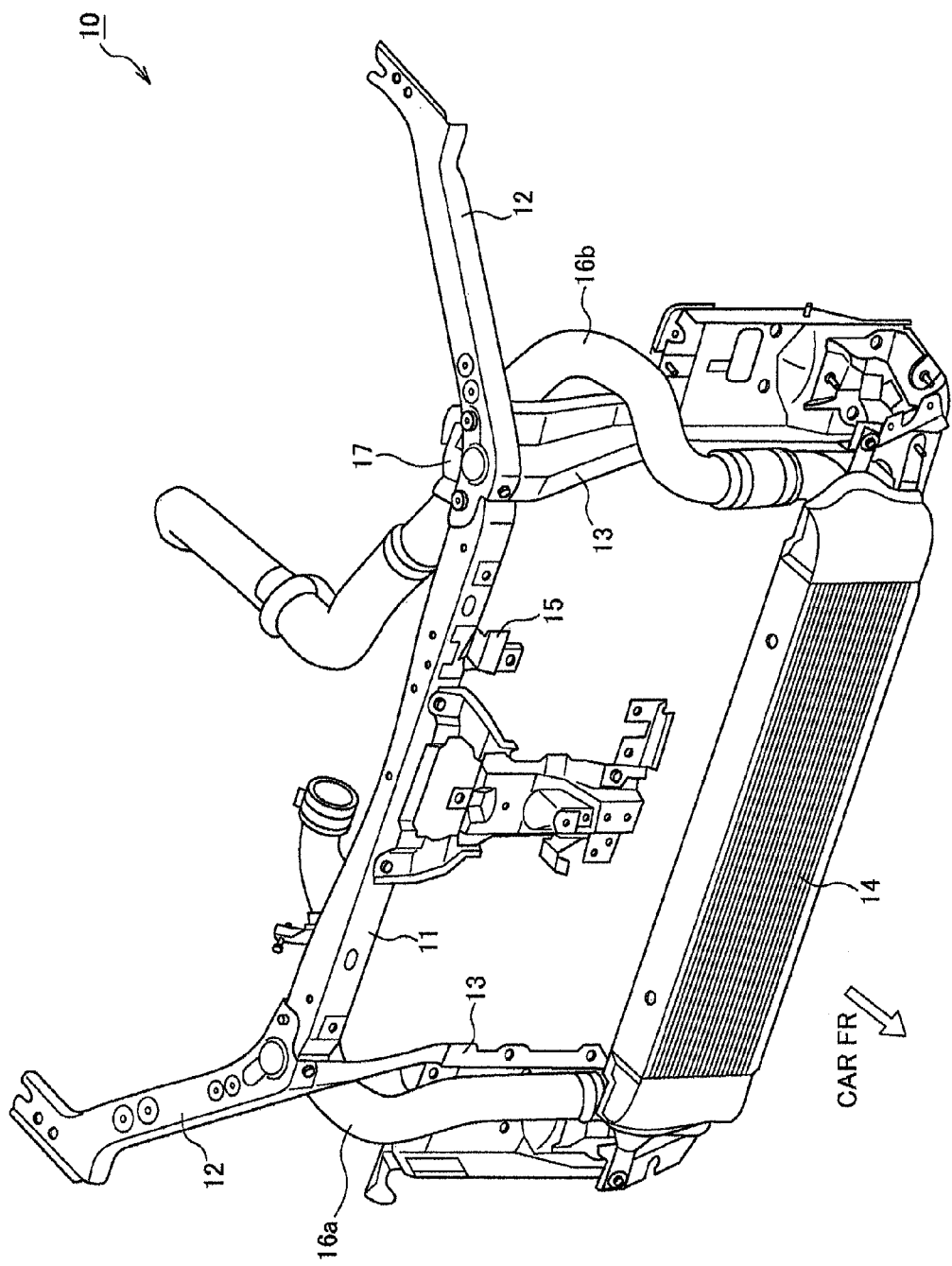
FIG. 1 is a perspective view of a vehicle front end structure in accordance with one embodiment.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 5, a vehicle front end structure 10 is illustrated in accordance with one embodiment. Basically, the vehicle front end structure 10 has an upper front frame 11, a pair of upper side frames 12, a pair of side front frames 13, an intercooler 14, an acceleration sensor 15, a pair of pipes 16a and 16b and a bracket 17 supporting the pipe 16b on at least one the frames 11, 12 and 13. The frames 11, 12 and 13 form a vehicle body frame that at least partially defines a front end of an engine compartment. In the illustrated embodiment, the intercooler 14 constitutes a frontward vehicle component that is disposed to protrude farther forward than the vehicle body frame with respect to the vehicle. The pipe 16b constitutes a rearward extending part that is connected to the frontward vehicle component (e.g., the intercooler 14) and extends from the frontward vehicle component to a rearward position of the vehicle body frame with respect to the vehicle. As explained below in more detail, a dimensional relationship is set between the bracket 17 and the vehicle body frame (e.g., the upper front frame 11) such that the bracket 17 and the rearward extending part (e.g., the pipe 16b) releases from the vehicle body frame (e.g., the upper front frame 11) when a force acts to move the frontward vehicle component (e.g., the intercooler 14) and the rearward extending part (e.g., the pipe 16b) rearward.

Figure 2:
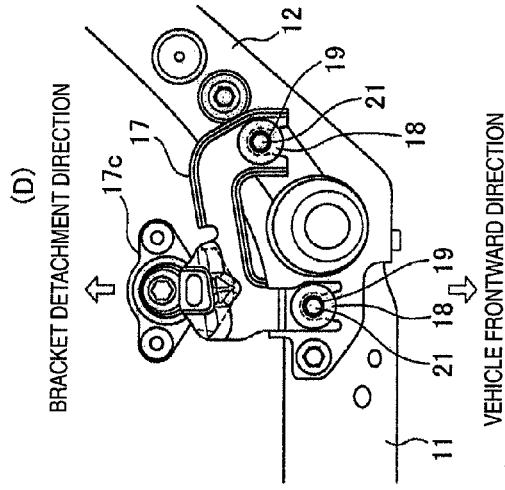
FIG. 2 is a top plan view of the vehicle front end structure illustrated in FIG. 1 in accordance with the illustrated embodiment.

The upper front frame 11 is an upper structural frame member that is arranged toward the front of the vehicle so as to extend in a widthwise direction of the vehicle. The upper side frames 12 are structural frame members that are connected to both ends of the upper front frame 11. The upper side frames 12 extend generally rearward. In this embodiment, as shown in FIG. 2, the upper side frames 12 extend rearward at an angle of approximately 45 degrees with respect to the upper front frame 11. However, it is acceptable for the angle to be larger or smaller than 45 degrees as needed and/or desired. The side front frames 13 are structural frame members that extend downward from positions in the vicinities of connection areas between the upper side frames 12 and the upper front frame 11. The intercooler 14 is a heat exchanger for cooling intake air that has been heated due to being supercharged with a supercharger. The intercooler 14 air-cools the intake air using the air flow resulting from movement of the vehicle. The intercooler 14 is mounted to the side front frames 13. The intercooler 14 is arranged to project farther frontward than the upper front frame 11.

The acceleration sensor 15 is mounted to the upper front frame 11. The acceleration sensor 15 is a sensor that detects an acceleration of the vehicle in the longitudinal direction of the vehicle. An air bag, for example, is actuated (deployed) based on a signal from the acceleration sensor 15.

The intercooler 14 is provided with a pair of pipes 16a and 16b for supplying intake air to an engine disposed behind the vehicle front end structure 10. The pipes 16a and 16b are connected to a rearwardly facing surface of the intercooler 14. Supercharged intake air flows into the intercooler 14 through the pipe 16a and is cooled. The cooled intake air then flows through the pipe 16b to the engine. The pipe 16b is supported by the bracket 17.

Figure 3:
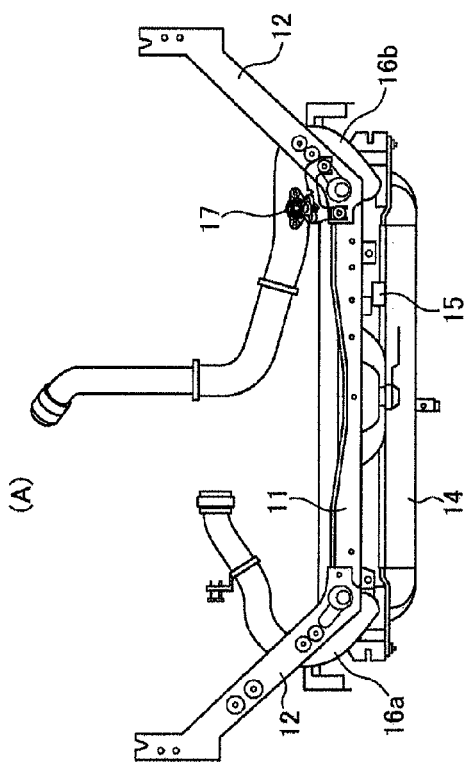
FIG. 3 is an enlarged partial top plan view of a portion of the vehicle front end structure illustrated in FIGS. 1 and 2 in accordance with the illustrated embodiment.
Figure 5:
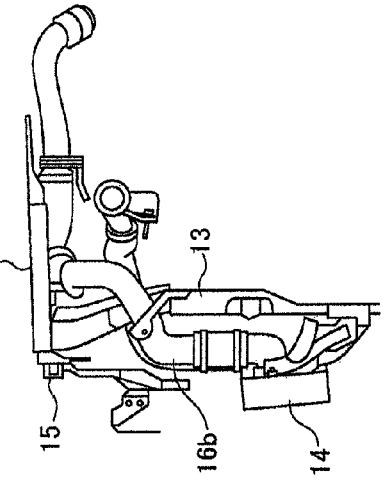
FIG. 5 is a side elevational view of the vehicle front end structure illustrated in FIGS. 1 to 4 in accordance with the illustrated embodiment.
Figure 4:
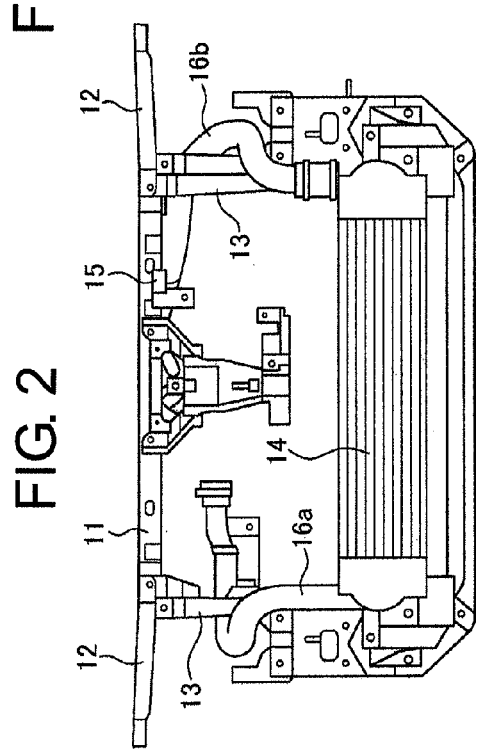
FIG. 4 is a front elevational view of the vehicle front end structure illustrated in FIGS. 1 to 3 in accordance with the illustrated embodiment.
Figure 6:
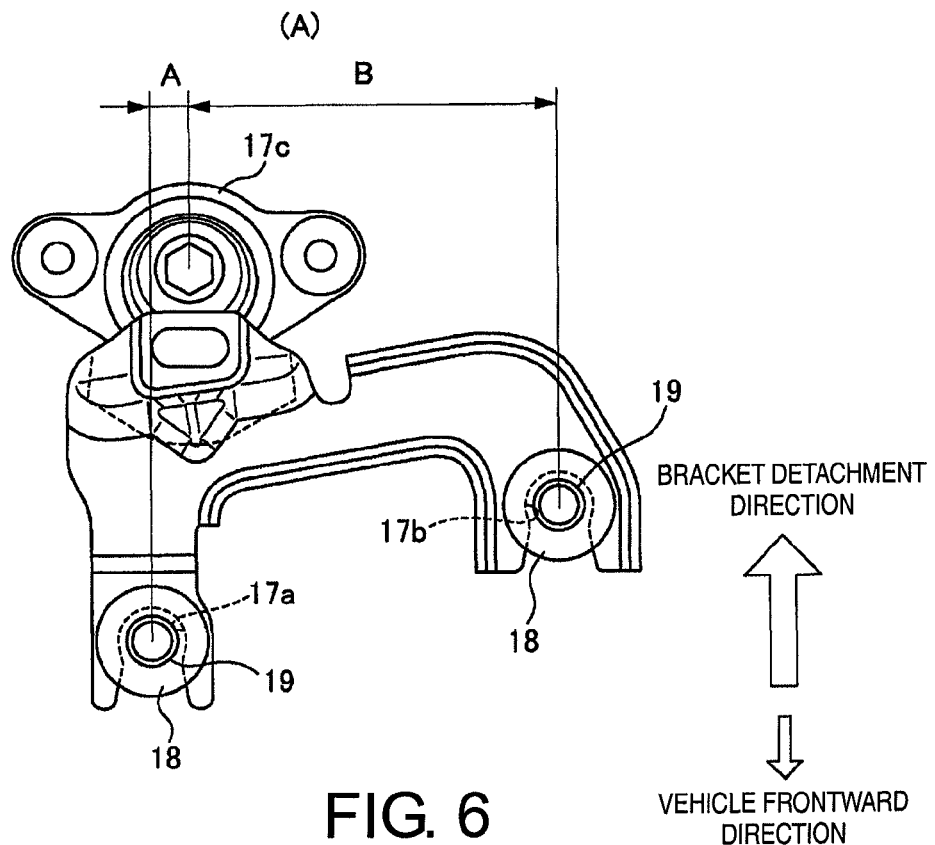
FIG. 6 is an enlarged top plan view of the bracket for the vehicle front end structure illustrated in FIGS. 1 to 4 in accordance with the illustrated embodiment.
Figure 7:
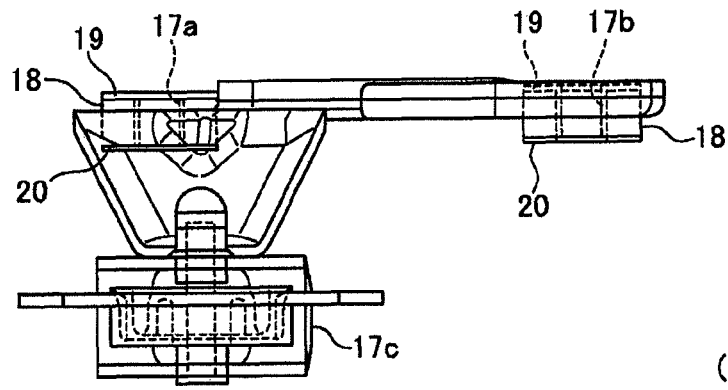
FIG. 7 is a front elevational view of the bracket illustrated in FIG. 6 in accordance with the illustrated embodiment.

As seen in FIGS. 3, 6 and 7, the bracket 17 is generally C-shaped when viewed from above, with a pair of vehicle body mounting sections 17a and 17b and a pipe securing section 17c. The vehicle body mounting sections 17a and 17b are formed on opposite ends of the bracket 17. The bracket 17 is attached to the vehicle front end structure 10 at the vehicle body mounting sections 17a and 17b. The pipe securing section 17c secures the pipe 16b to the bracket 17. Thus, the bracket 17 is fixed with the vehicle body mounting sections 17a and 17b to a portion of the vehicle front end structure 10 where the upper front frame 11 and one of the upper side frames 12 are connected together. The connection area between the upper front frame 11 and the upper side frame 12 constitutes a curved portion of the upper frame section of the vehicle front end structure 10. The bracket 17 is configured to span between the vehicle body mounting sections 17a and 17b.

The curved portions where the upper front frame 11 and the upper side frames 12 connect together have a high rigidity and fixing the bracket 17 to one of these positions enables the pipe 16b to be supported in a stable manner such that unnecessary vibrations are not transmitted to the vehicle body during normal travel. When the vehicle undergoes a frontal collision causing the intercooler 14 to be pushed rearward, the pipe 16b connected to the intercooler 14 moves rearward along with the intercooler 14. Also the bracket 17 moves rearward with the pipe 16b during such a frontal collision. Since the upper frame section of the vehicle front end structure 10 has a high rigidity at the mounting position of the bracket 17, the upper frame section does not deform when the pipe 16b moves rearward, but rather the bracket 17 detaches from the upper frame section more readily than if it were mounted in a different position of the frame.

The upper front frame 11 and the front upper side frames 12 can also be formed as an integral unit. The same effect can be obtained when the bracket 17 is attached at the curved portion, which has a high rigidity for mounting the bracket 17.

As shown in FIGS. 3, 6 and 7, the vehicle body mounting sections 17a and 17b of the bracket 17 are each provided with a rubber mounting member 18, a sleeve 19, a washer 20 and a bolt 21. The rubber mounting members 18 are arranged inside the vehicle body mounting sections 17a and 17b of the bracket 17 with each of the rubber mounting members 18 having one of the sleeves 19 being inserted inside the inner circumference of a corresponding one of the rubber mounting members 18. The bolts 21 pass through the sleeves 19, which are attached in the vicinity of where the upper side frame 12 connects to the upper front frame 11. Thus, the bracket 17 is secured in a position farther rearward than the connection area between the upper front frame 11 and the upper side frame 12.

Figure 8:
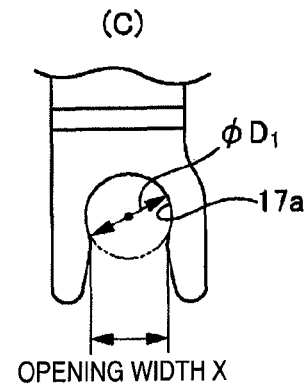
FIG. 8 is a partial top plan view of a portion of the bracket illustrated in FIGS. 6 and 7 in accordance with the illustrated embodiment.

FIGS. 6 to 8 show some enlarged views of the bracket 17. FIG. 6 is a top plan view of the bracket 17. FIG. 7 is a front elevational view of the bracket 17. FIG. 8 is an enlarged, partial top plan view of the vehicle body mounting section 17a, which is where the bracket 17 is mounted to the connection area between the upper front frame 11 and the upper side frame 12. At the vehicle body mounting section 17a, the upper side frame 12 overlaps with the upper front frame 11 so that the bolt 21 pass through both of the connected to the upper front frame 11 and the upper side frame 12.

As seen in FIGS. 3 and 6, the pipe securing section 17c of the bracket 17 is provided on the opposite side of the bracket 17 from the vehicle body mounting sections 17a and 17b. The pipe securing section 17c is arranged closer to the vehicle body mounting section 17a than the vehicle body mounting section 17b. In other words, as seen in FIG. 6, a distance A between the vehicle body mounting section 17a and the pipe securing section 17c is smaller than the distance B between the vehicle body mounting section 17b and the pipe securing section 17c. When the bracket 17 is mounted to the vehicle front end structure 10, the vehicle body mounting section 17a is arranged closer to the acceleration sensor 15 than the vehicle body mounting section 17b.

As shown in FIG. 8, each of the tip ends of the vehicle body mounting sections 17a and 17b has an open ended slot with an enlarged area and a frontward opening with an opening width X. The opening width X is smaller than a hole width or diameter $\phi\, D_1$ of the enlarged areas of the open ended slot formed in the tip ends of the vehicle body mounting sections 17a and 17b that receive the sleeves 19. Thus, the opening width X of the frontward opening is narrower than the hole width or diameter $\phi\, D_1$ of the enlarged areas. The rubber mounting members 18 are releasably retained in the enlarged area of the open ended slots in a reattachable manner by a snap-fit arrangement in which the rubber mounting members 18 radially compress and expand radially during installation and disengagement.

Figure 9:
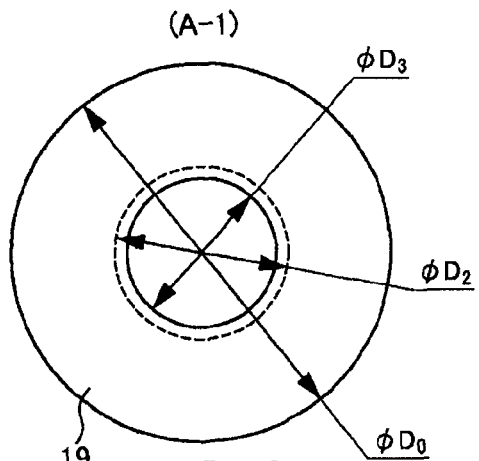
FIG. 9 is a top plan view of the sleeve for the bracket illustrated in FIGS. 6 and 7.
Figure 10:
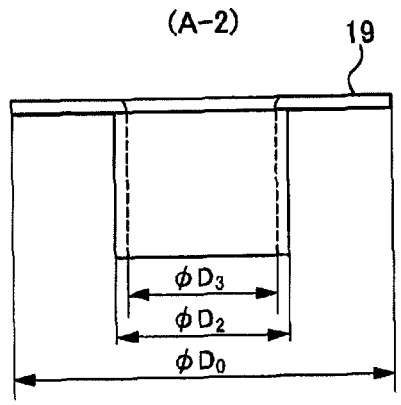
FIG. 10 is a side elevational view of the sleeve illustrated in FIG. 9 for the bracket illustrated in FIGS. 6 and 7.
Figure 11:
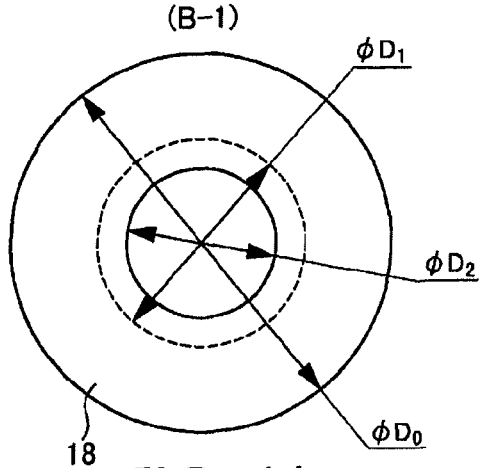
FIG. 11 is a top plan view of the rubber mounting member for the bracket illustrated in FIGS. 6 and 7.
Figure 12:
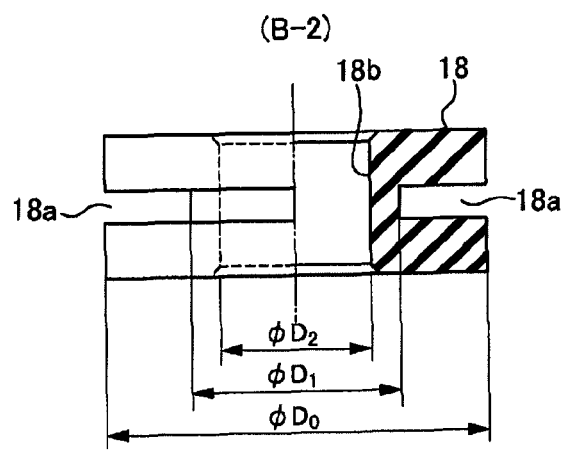
FIG. 12 is a half cross sectional view of the rubber mounting member illustrated in FIG. 11 for the bracket illustrated in FIGS. 6 and 7.
Figure 13:
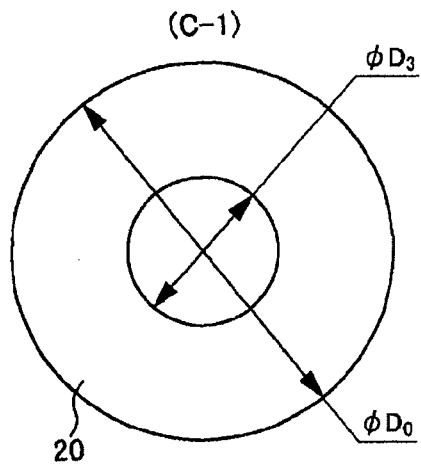
FIG. 13 is a top plan view of the washer for the bracket illustrated in FIGS. 6 and 7.
Figure 14:
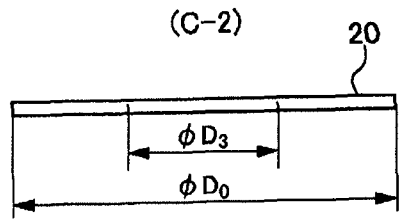
FIG. 14 is a side elevational view of the washer illustrated in FIG. 13 for the bracket illustrated in FIGS. 6 and 7.

FIGS. 9 to 14 shows the component parts that are arranged at the tip ends of the bracket 17 are illustrated in greater detail. FIG. 9 is a top plan view of one of the sleeves 19. FIG. 10 is a side elevational view of one of the sleeves 19. FIG. 11 is a top plan view of one of the rubber mounting members 18. FIG. 12 is a half cross sectional view of one of the rubber mounting members 18. FIG. 13 is a top plan view of one of the washers 20. FIG. 14 is a side elevational view of one of the washers 20.

The sleeve 19 is made of metal. The flange-like portion of the sleeve 19 has an outermost width or diameter $\phi\, D_0$, an external width or diameter $\phi\, D_2$ of the cylindrical portion, and an internal width or diameter $\phi\, D_3$ of the cylindrical portion. The rubber mounting member 18 also has an outermost width or diameter $\phi\, D_0$. The rubber mounting member 18 has a recessed portion 18a with a width or diameter $\phi\, D_1$. A hole having an internal width or diameter $\phi\, D_2$ passes through the center of the rubber mounting member 18. The washer 20 has an external width or diameter $\phi\, D_0$ and an internal diameter of $\phi\, D_3$. Thus, the rubber mounting members 18 have their widths or diameters $\phi\, D_1$ being larger than the opening widths X of the frontward openings such that when a force acts to move the intercooler 14 and the pipe 16b rearward, the open ended slots of the vehicle body mounting sections 17a and 17b detach from the rubber mounting members 18 and the pipe 16b moves rearward relative to the vehicle body frame (e.g., the frames 11 and 12). In other words, the bracket 17 and the pipe 16b releases from the vehicle body frame (e.g., the frames 11 and 12) without applying a twisting force to the vehicle body frame (e.g., the frames 11 and 12).

When the bracket 17 is mounted to the vehicle front end structure 10, the vehicle body mounting sections 17a and 17b of the bracket 17 are first inserted into the recessed portions 18a of a respective one of the rubber mounting members 18. The sleeves 19 are then inserted into the holes 18b of the mounting members 18 with the washers 20 arranged on the distal end of the sleeves 19 as shown in FIG. 7. Finally, the bolts 21 are inserted through the sleeves 19, which are assembled with rubber mounting members 18 and the washers 20, and then the bolts 21 are threaded into threaded holes formed in the upper front frame 11.

Observations made during the course of vehicle development will now be explained in order to facilitate understanding of the present invention. Crash tests were conducted with vehicles constructed with vehicle front end structures that had a longitudinal acceleration sensor 15 mounted to a front frame and a frontward vehicle component (e.g., an intercooler) mounted in a position farther forward than the front frame. The tests revealed that the timing at which an air bag was deployed was delayed (late). The research was then diligently conducted to find the cause of this delay. The cause as revealed by the research will now be explained.

Figure 15:
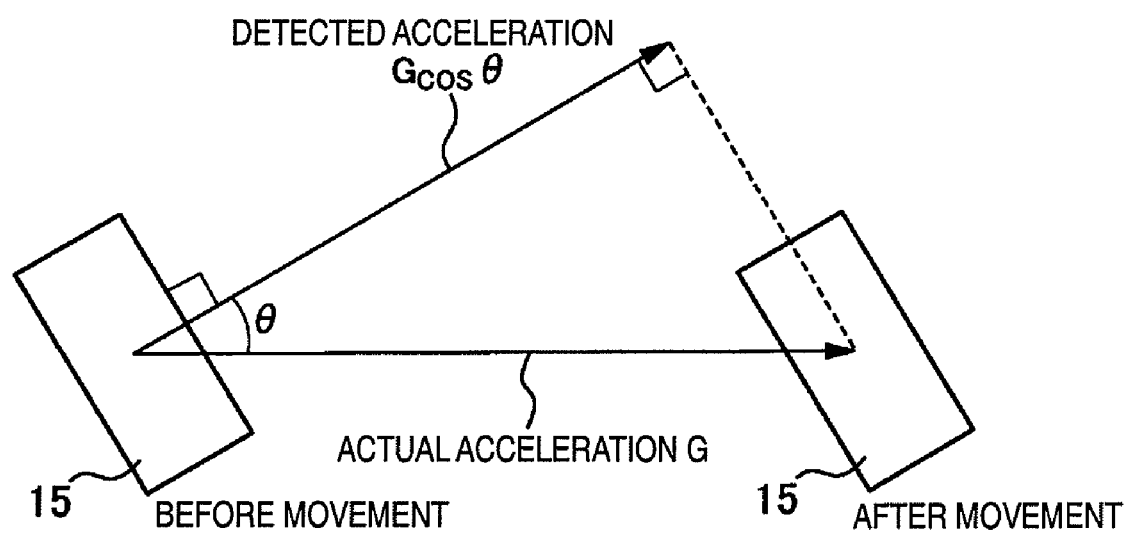
FIG. 15 is schematic diagram illustrating how the detection accuracy of the acceleration sensor becomes degraded.

When a vehicle collides, the intercooler or other frontward vehicle component moves diagonally rearward and upward. When this occurs, an intercooler pipe also moves diagonally rearward and upward. Since the intercooler pipe is fixed to the vehicle body frame (e.g., the upper front frame) with a conventional bracket in a conventional vehicle front end structure, a moment is exerted against the vehicle body frame (upper front frame 11) when the intercooler pipe 16b moves diagonally upward and rearward 16b, thus, causing the vehicle body frame to be twisted. When the vehicle body frame (e.g., the upper front frame) is twisted, the acceleration sensor mounted to the vehicle body frame (e.g., the upper front frame) assumes a diagonal orientation. Since the acceleration sensor is contrived to detect only the longitudinal acceleration of the vehicle, it can only detect a portion of the longitudinal acceleration when it is in a diagonal orientation. More specifically, as shown in FIG. 15, if the orientation of the acceleration sensor 15 is offset from the longitudinal direction of the vehicle by an angle θ, then the acceleration sensor 15 will detect an acceleration value G×cos θ when the actual longitudinal acceleration is G. Thus, since the detection value is smaller than the actual value G, the timing at which the air bag is deployed is delayed.

In view of this problem, the illustrated embodiment is contrived such that the bracket 17 separates (detaches) from the vehicle body frame (i.e., the upper front frame 11) when a force (e.g., a collision force) that is larger than the normal driving condition forces acts on the bracket 17. As a result, the vehicle body frame (i.e., the upper front frame 11) does not become twisted. More specifically, the pipe bracket 17 is arranged farther rearward than the vehicle body frame (i.e., the upper front frame 11), and the tip ends of the vehicle body mounting sections 17a and 17b (which are on the frontward side of the bracket 17) each open with an opening width X. The opening widths X are larger than the external diameter $\phi\, D_2$ of the sleeves 19. The sleeves 19 are arranged on the vehicle frame mounting sections 17a and 17b of the bracket 17 through the rubber mounting members 18.

Figure 16:
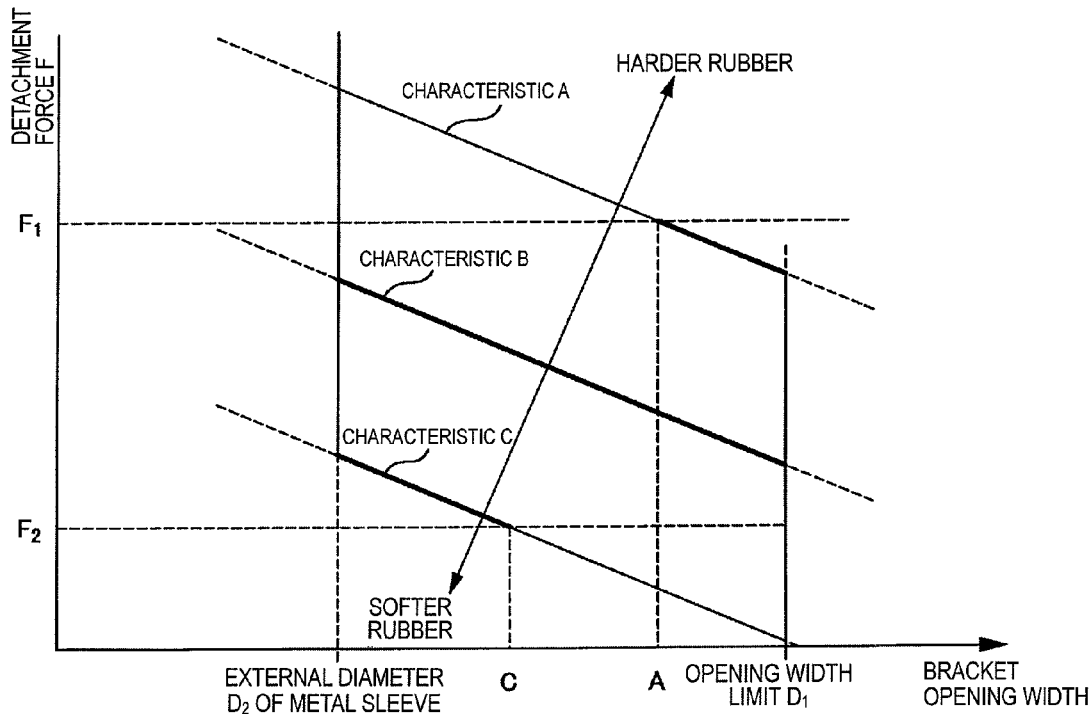
FIG. 16 is a graph that illustrates the dimensional relationships of the component parts arranged at the ends of the bracket.

The relationships on which the dimensions of the various parts are based will now be explained. The bolts 21 are determined based on the axial force required for mounting the bracket 17. The dimensions of the sleeves 19 are determined based on the dimensions of the bolts. Once the material of the rubber mounting members 18 is decided, the force F at which the sleeve 19 will detach from the bracket 17 relates to the opening width X of the vehicle body mounting sections 17a and 17b of the bracket 17 as shown in FIG. 16. The detachment force F is smaller when the opening width X is larger and larger when the opening width X is smaller. The opening width X of each of the vehicle body mounting sections 17a and 17b must not be larger than the hole diameter $\phi\, D_1$ of the tip end of the vehicle body mounting section 17a or 17b. If the opening width X is set to be larger than the diameter $\phi\, D_1$, then the bracket 17 might become detached even if a load is not acting on the bracket 17. Thus, the diameter $\phi\,D_1$ is the limit value of the opening width X. Meanwhile, the opening width X must be larger than the external diameter $\phi\,D_2$ of the sleeve 19. If the opening width X is smaller than the diameter $\phi\,D_2$, then the bracket 17 might not detach from the vehicle body frame even if a collision load acts thereon.

When, for example, a rubber material having the characteristic A (harder rubber) is used as the material of the rubber mounting member 18, there is the possibility that the detachment force F will be larger than a minimum value F1 of the load that could occur during a collision if the opening width X of the bracket 17 is smaller than a width A. Thus, in such a case, the bracket 17 might not detach if a load equal to the value $F_1$ occurred. Therefore, if a rubber material having the characteristic A (harder rubber) is selected as the material for the rubber mounting member 18, then the bracket opening width X is set to a value that is larger than A and smaller than $\phi\,D_1$.

When a rubber material having the characteristic C (softer rubber) is used as the material of the rubber mounting member 18, there is the possibility that the detachment force F will be smaller than a maximum value $F_2$ of the loads occur normally (without a collision) if the opening width X of the bracket 17 is larger than a width C. Thus, in such a case, the bracket 17 might detach if a load equal to the value $F_2$ occurred. Therefore, if a rubber material having the characteristic C (softer rubber) is selected as the material for the rubber mounting member 18, then the bracket opening width X is set to a value that is smaller than C and larger than $\phi\,D_2$.

Figure 17:
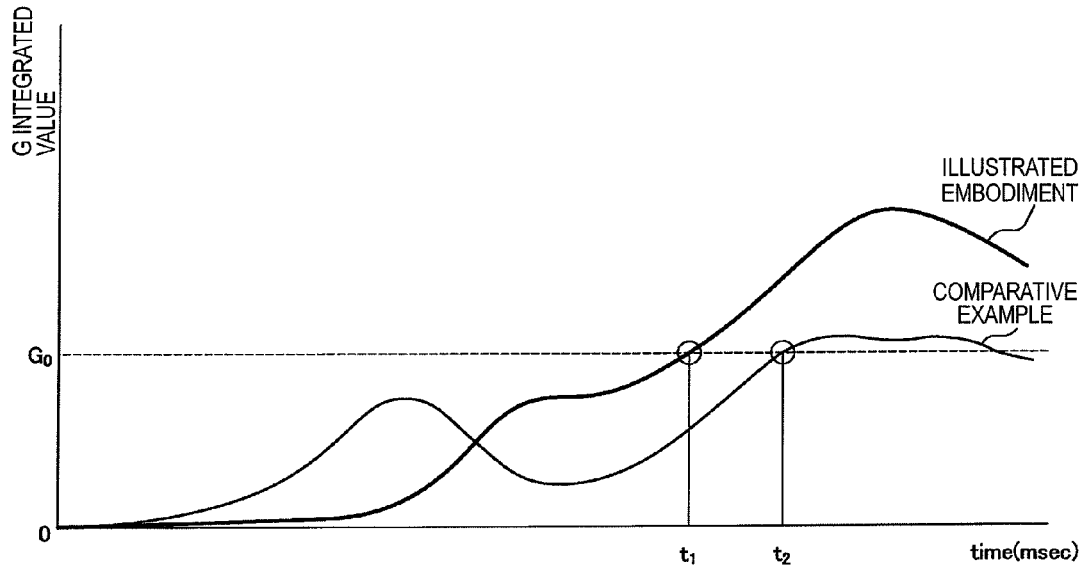
FIG. 17 is a graph that illustrates the effects of a vehicle having the vehicle front end structure in accordance with the illustrated embodiment verses a vehicle having a conventional vehicle front end structure.

The effects of the present invention provided with the constituent features described above will now be explained with reference to FIG. 17. In FIG. 17, the horizontal axis indicates the time and the vertical axis indicates an integrated value of the detection value G of the acceleration sensor 15. When the integrated value exceeds a reference value G, the air bag is deployed.

If the bracket 17 does not detach from the sleeves 19 when a collision occurs, then the vehicle body frame (i.e., the upper front frame 11) will become twisted and the time required for the integration value of the acceleration sensor detection value G to reach the reference value will be longer. In FIG. 17, in the case of a conventional vehicle front end structure (i.e., a comparative example not in accordance with the present invention), the integration value of G reaches the reference value at a time t2 and stays substantially constant thereafter. Thus, depending on variations in the component parts and variations in the collision state, it is possible for the integration value to become constant immediately before the reference value is reached such that the integration value cannot reach the reference value.

With the illustrated embodiment, since the bracket 17 detaches from the sleeves 19 when a collision occurs, less time is required for the integration value of the acceleration sensor detection value G to reach the reference value. In FIG. 17, in the case of the illustrated embodiment, the integration value exceeds the reference value early at a time t1. Thus, with the illustrated embodiment, even if variations exist in the component parts and the collision state, the integration value exceeds the reference value quickly in the vicinity of the time t1. As a result, the performance of a vehicle front end structure in accordance with the illustrated embodiment is not easily affected by variations in the component parts and the collision state.

Additionally, in the illustrated embodiment, the pipe securing section 17*c* (which secures the pipe 16*b*) is arranged closer to the vehicle body mounting section 17*a* (which is positioned closer to the accelerator sensor) than to the vehicle body mounting section 17*b*. Therefore, when a collision load acts on the bracket 17, the vehicle body mounting section 17*a* separates from the vehicle body frame sooner than the vehicle body mounting section 17*b*. As a result, the effect of the collision on the acceleration sensor 15 can be reduced even further.

Additionally, in the illustrated embodiment, the bracket 17 is mounted to a portion where the front frame 11 and the upper side frame 12 connect together. Since this portion is less likely to undergo deformation than other portions (e.g., a portion in the vicinity of the middle of the front frame 11) when a collision load occurs, the bracket 17 can be made to separate from the vehicle body frame more reliably by mounting it to such a portion.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "frontward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle front end structure comprising:
   a vehicle body frame forming a frontward portion of a vehicle;
   an acceleration sensor mounted to the vehicle body frame to detect a longitudinal acceleration rate of the vehicle;

a frontward vehicle component disposed to protrude farther forward than the vehicle body frame with respect to the vehicle;
a rearward extending part connected to the frontward vehicle component and extending from the frontward vehicle component to a rearward position of the vehicle body frame with respect to the vehicle; and
a bracket fixing the rearward extending part to the vehicle body frame at a connection area such that the rearward extending part is located farther rearward than the connection area of the vehicle body frame, with the connection area of the vehicle body frame being located forward of the vehicle with respect to an attachment position of the rearward extending part at which the bracket is fixedly coupled to the rearward extending part, with the bracket being constructed such that the rearward extending part is released from the vehicle body frame when a force acts to move the frontward vehicle component and the rearward extending part rearward.

2. The vehicle front end structure as recited in claim 1, wherein
the vehicle body frame includes a rubber mounting member, and
the bracket includes a vehicle body mounting section having an open ended slot with an enlarged area and a frontward opening that is narrower than the enlarged area, the rubber mounting member being retained in the enlarged area of the open ended slot with the rubber mounting member having a width that is larger than an opening width of the frontward opening such that when the force acts to move the frontward vehicle component and the rearward extending part rearward, the open ended slot of the vehicle body mounting section detaches from the rubber mounting member and the rearward extending part moves rearward relative to the vehicle body frame.

3. The vehicle front end structure as recited in claim 1, wherein
the frontward vehicle component includes an intercooler and the rearward extending part includes a pipe connected to the intercooler.

4. A vehicle front end structure comprising:
a vehicle body frame forming a frontward portion of a vehicle, the vehicle body frame including a rubber mounting member;
an acceleration sensor mounted to the vehicle body frame to detect a longitudinal acceleration rate of the vehicle;
a frontward vehicle component disposed to protrude farther forward than the vehicle body frame with respect to the vehicle;
a rearward extending part connected to the frontward vehicle component and extending from the frontward vehicle component to a rearward position of the vehicle body frame with respect to the vehicle; and
a bracket fixing the rearward extending part to the vehicle body frame at a connection area such that the rearward extending part is located farther rearward than the connection area of the vehicle body frame, with the bracket being constructed such that the rearward extending part is released from the vehicle body frame when a force acts to move the frontward vehicle component and the rearward extending part rearward,
the bracket including a vehicle body mounting section having an open ended slot with an enlarged area and a frontward opening that is narrower than the enlarged area, the rubber mounting member being retained in the enlarged area of the open ended slot with the rubber mounting member having a width that is larger than an opening width of the frontward opening such that when the force acts to move the frontward vehicle component and the rearward extending part rearward, the open ended slot of the vehicle body mounting section detaches from the rubber mounting member and the rearward extending part moves rearward relative to the vehicle body frame,
the rubber mounting member and the opening width of the frontward opening being set with respect to each other such that as a hardness of the rubber mounting member becomes harder, a minimum value of a settable range of the opening width of the frontward opening becomes larger.

5. A vehicle front end structure comprising:
a vehicle body frame forming a frontward portion of a vehicle, the vehicle body frame including a rubber mounting member;
an acceleration sensor mounted to the vehicle body frame to detect a longitudinal acceleration rate of the vehicle;
a frontward vehicle component disposed to protrude farther forward than the vehicle body frame with respect to the vehicle;
a rearward extending part connected to the frontward vehicle component and extending from the frontward vehicle component to a rearward position of the vehicle body frame with respect to the vehicle; and
a bracket fixing the rearward extending part to the vehicle body frame at a connection area such that the rearward extending part is located farther rearward than the connection area of the vehicle body frame, with the bracket being constructed such that the rearward extending part is released from the vehicle body frame when a force acts to move the frontward vehicle component and the rearward extending part rearward,
the bracket including a vehicle body mounting section having an open ended slot with an enlarged area and a frontward opening that is narrower than the enlarged area, the rubber mounting member being retained in the enlarged area of the open ended slot with the rubber mounting member having a width that is larger than an opening width of the frontward opening such that when the force acts to move the frontward vehicle component and the rearward extending part rearward, the open ended slot of the vehicle body mounting section detaches from the rubber mounting member and the rearward extending part moves rearward relative to the vehicle body frame,
the rubber mounting member and the opening width of the frontward opening being set with respect to each other such that as a hardness of the rubber mounting member becomes softer, a maximum value of a settable range of the opening width of the frontward opening becomes smaller.

6. A vehicle front end structure comprising:
a vehicle body frame forming a frontward portion of a vehicle, the vehicle body frame including a rubber mounting member;
an acceleration sensor mounted to the vehicle body frame to detect a longitudinal acceleration rate of the vehicle;
a frontward vehicle component disposed to protrude farther forward than the vehicle body frame with respect to the vehicle;
a rearward extending part connected to the frontward vehicle component and extending from the frontward vehicle component to a rearward position of the vehicle body frame with respect to the vehicle; and a bracket fixing the rearward extending part to the vehicle body frame at a connection area such that the rearward extending part is located farther rearward than the connection area of the vehicle body frame, with the bracket being constructed such that the rearward extending part is released from the vehicle body frame when a force acts to move the frontward vehicle component and the rearward extending part rearward, the bracket including a vehicle body mounting section having an open ended slot with an enlarged area and a frontward opening that is narrower than the enlarged area, the rubber mounting member being retained in the enlarged area of the open ended slot with the rubber mounting member having a width that is larger than an opening width of the frontward opening such that when the force acts to move the frontward vehicle component and the rearward extending part rearward, the open ended slot of the vehicle body mounting section detaches from the rubber mounting member and the rearward extending part moves rearward relative to the vehicle body frame, the bracket further including an additional vehicle body mounting section releasably retained to the vehicle body frame by an additional rubber mounting member, with a portion of the bracket that supports the rearward extending part being arranged closer to the vehicle body mounting section that is closer to the acceleration sensor.

7. A vehicle front end structure comprising:
a vehicle body frame forming a frontward portion of a vehicle, the vehicle body frame including a rubber mounting member;
an acceleration sensor mounted to the vehicle body frame to detect a longitudinal acceleration rate of the vehicle;
a frontward vehicle component disposed to protrude farther forward than the vehicle body frame with respect to the vehicle;
a rearward extending part connected to the frontward vehicle component and extending from the frontward vehicle component to a rearward position of the vehicle body frame with respect to the vehicle; and
a bracket fixing the rearward extending part to the vehicle body frame at a connection area such that the rearward extending part is located farther rearward than the connection area of the vehicle body frame, with the bracket being constructed such that the rearward extending part is released from the vehicle body frame when a force acts to move the frontward vehicle component and the rearward extending part rearward, the bracket including a vehicle body mounting section having an open ended slot with an enlarged area and a frontward opening that is narrower than the enlarged area, the rubber mounting member being retained in the enlarged area of the open ended slot with the rubber mounting member having a width that is larger than an opening width of the frontward opening such that when the force acts to move the frontward vehicle component and the rearward extending part rearward, the open ended slot of the vehicle body mounting section detaches from the rubber mounting member and the rearward extending part moves rearward relative to the vehicle body frame, the bracket further including an additional vehicle body mounting section releasably retained to the vehicle body frame by an additional rubber mounting member, with the vehicle body mounting sections being fixed so as to straddle a curved portion of the vehicle body frame.

8. A vehicle front end structure comprising:
a vehicle body frame forming a frontward portion of a vehicle, the vehicle body frame including a rubber mounting member;
an acceleration sensor mounted to the vehicle body frame to detect a longitudinal acceleration rate of the vehicle;
a frontward vehicle component disposed to protrude farther forward than the vehicle body frame with respect to the vehicle;
a rearward extending part connected to the frontward vehicle component and extending from the frontward vehicle component to a rearward position of the vehicle body frame with respect to the vehicle; and
a bracket fixing the rearward extending part to the vehicle body frame at a connection area such that the rearward extending part is located farther rearward than the connection area of the vehicle body frame, with the bracket being constructed such that the rearward extending part is released from the vehicle body frame when a force acts to move the frontward vehicle component and the rearward extending part rearward, the bracket including a vehicle body mounting section having an open ended slot with an enlarged area and a frontward opening that is narrower than the enlarged area, the rubber mounting member being retained in the enlarged area of the open ended slot with the rubber mounting member having a width that is larger than an opening width of the frontward opening such that when the force acts to move the frontward vehicle component and the rearward extending part rearward, the open ended slot of the vehicle body mounting section detaches from the rubber mounting member and the rearward extending part moves rearward relative to the vehicle body frame, the vehicle body frame further including a mounting bolt with a sleeve disposed on a shaft portion of the mounting bolt, and the rubber mounting member being disposed on the sleeve, with the sleeve having a width that is smaller than the opening width of the frontward opening.

9. A vehicle front end structure comprising:
a vehicle body frame forming a frontward portion of a vehicle, the vehicle body frame including a rubber mounting member;
a frontward vehicle component disposed to protrude farther forward than the vehicle body frame with respect to the vehicle;
a pipe connected to the frontward vehicle component and extending from the frontward vehicle component; and
a bracket supporting the pipe on the vehicle body frame, the bracket including a vehicle body mounting section having an open ended slot with an enlarged area and a frontward opening that is narrower than the enlarged area, the rubber mounting member being releasably retained in the enlarged area open ended slot with the rubber mounting member having a width that is larger than an opening width of the frontward opening such that when a force acts to move the frontward vehicle component and the pipe rearward, the open ended slot of the vehicle body mounting section detaches from the rubber mounting member and the pipe moves rearward relative to the vehicle body frame.

10. The vehicle front end structure as recited in claim 9, wherein
the vehicle body frame further includes a mounting bolt with a sleeve disposed on a shaft portion of the mounting bolt, and the rubber mounting member is disposed on the sleeve, with the sleeve having a width that is smaller than the opening width of the frontward opening.

11. The vehicle front end structure as recited in claim 9, wherein the rubber mounting member and the opening width of the frontward opening are set with respect to each other such that as a hardness of the rubber mounting member becomes harder, a minimum value of a settable range of the opening width of the frontward opening becomes larger.

12. The vehicle front end structure as recited in claim 9, wherein the rubber mounting member and the opening width of the frontward opening are set with respect to each other such that as a hardness of the rubber mounting member becomes softer, a maximum value of a settable range of the opening width of the frontward opening becomes smaller.

* * * * *